United States Patent
Rasch et al.

(10) Patent No.: US 9,425,656 B2
(45) Date of Patent: Aug. 23, 2016

(54) TRANSVERSE FLUX MACHINE

(75) Inventors: Reinhard Rasch, Hechendorf (DE);
Andreas Gruendl, Starnberg (DE);
Bernhard Hoffmann, Starnberg (DE);
Heidimarie Loos, Tutzing (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 13/520,329

(22) PCT Filed: Dec. 29, 2010

(86) PCT No.: PCT/EP2010/070837
§ 371 (c)(1),
(2), (4) Date: Oct. 1, 2012

(87) PCT Pub. No.: WO2011/080294
PCT Pub. Date: Jul. 7, 2011

(65) Prior Publication Data
US 2013/0015733 A1    Jan. 17, 2013

(30) Foreign Application Priority Data
Dec. 30, 2009    (DE) .......................... 10 2009 060 959

(51) Int. Cl.
*H02K 1/20* (2006.01)
*H02K 1/14* (2006.01)
*H02K 3/50* (2006.01)
*H02K 21/22* (2006.01)
(Continued)

(52) U.S. Cl.
CPC .................. *H02K 1/145* (2013.01); *H02K 1/20* (2013.01); *H02K 3/50* (2013.01); *H02K 3/525* (2013.01); *H02K 21/227* (2013.01); *H02K 5/225* (2013.01); *H02K 2201/12* (2013.01)

(58) Field of Classification Search
CPC ........... H02K 3/50; H02K 3/525; H02K 1/20; H02K 1/145
USPC ............... 310/58, 59, 60 R, 61–63, 60 A, 257
See application file for complete search history.

(56) References Cited

U.S. PATENT DOCUMENTS

| 765,078 | A | * | 7/1904 | jigouzo ......................... 310/112 |
| 5,196,752 | A | * | 3/1993 | Palma ........................... 310/260 |
| 6,107,708 | A | * | 8/2000 | Yamaguchi et al. ............ 310/58 |

(Continued)

OTHER PUBLICATIONS

PCT/EP2010/070837 International Search Report dated Apr. 16, 2012 (English Translation and Original, 6 pages).

(Continued)

*Primary Examiner* — Dang Le
(74) *Attorney, Agent, or Firm* — Michael Best & Friedrich LLP

(57) ABSTRACT

A transversal flux machine having a stator and an external rotor disposed about the stator, the stator comprising two axial end faces, having an inner core of the stator, having a cooling path disposed radially within the inner core, wherein a cooling path either a) protrudes out of the transversal flux machine on the axial end face of the stator, said transversal flux machine facing away from an inlet side, or b) the cooling path protrudes out of the transversal flux machine on the axial end face of the stator, said transversal flux machine facing away from the inlet side, the cooling path running between the inlet and the outlet in an intermediate space between the stator and the external rotor of the stator facing the inlet side, the cooling path between the inlet and the outlet running in an intermediate space between the stator and the external rotor.

10 Claims, 21 Drawing Sheets

(51) Int. Cl.
*H02K 3/52* (2006.01)
*H02K 5/22* (2006.01)

(56) References Cited

U.S. PATENT DOCUMENTS

| | | | |
|---|---|---|---|
| 6,297,572 B1 * | 10/2001 | Sunaga et al. | 310/68 R |
| 6,384,494 B1 * | 5/2002 | Avidano et al. | 310/58 |
| 6,744,157 B2 * | 6/2004 | Choi et al. | 310/62 |
| 7,122,923 B2 * | 10/2006 | Lafontaine et al. | 310/58 |
| 7,579,742 B1 | 8/2009 | Rittenhouse | |
| 7,598,634 B2 * | 10/2009 | Izumi | 310/58 |
| 2006/0226717 A1 | 10/2006 | Nagayama et al. | |
| 2007/0210656 A1 * | 9/2007 | Lafontaine et al. | 310/58 |
| 2007/0252448 A1 | 11/2007 | Muhlberger et al. | |
| 2008/0136272 A1 | 6/2008 | Ishikawa et al. | |
| 2010/0231066 A1 | 9/2010 | Körner | |

OTHER PUBLICATIONS

Bork, "Entwicklung and Optimierung einer fertigungsgerechten Transversalflussmaschine [Development and optimization of a transverse flux machine suitable for manufacture]," Jan. 28, 1997, Fakultät für Elektrotechnik, RWTH Aachen (English Translation and Original, pp. 73-84).

* cited by examiner

TRANSVERSE FLUX MACHINE

BACKGROUND OF THE INVENTION

The design of a transverse flux machine is known from the dissertation "Entwicklung and Optimierung einer fertigungsgerechten Transversalflussmaschine" [Development and optimization of a transverse flux machine suitable for manufacture], author Mr. Michael Bork, Shaker-Verlag, publication year, in particular page 84 therein.

The problem consists in improving the cooling of the machine.

BRIEF DESCRIPTION OF THE DRAWINGS

Exemplary embodiments of the method according to the invention as well as a control apparatus and a system with a control apparatus and a start apparatus are illustrated in the drawings, in which.

DETAILED DESCRIPTION

Figure 1:
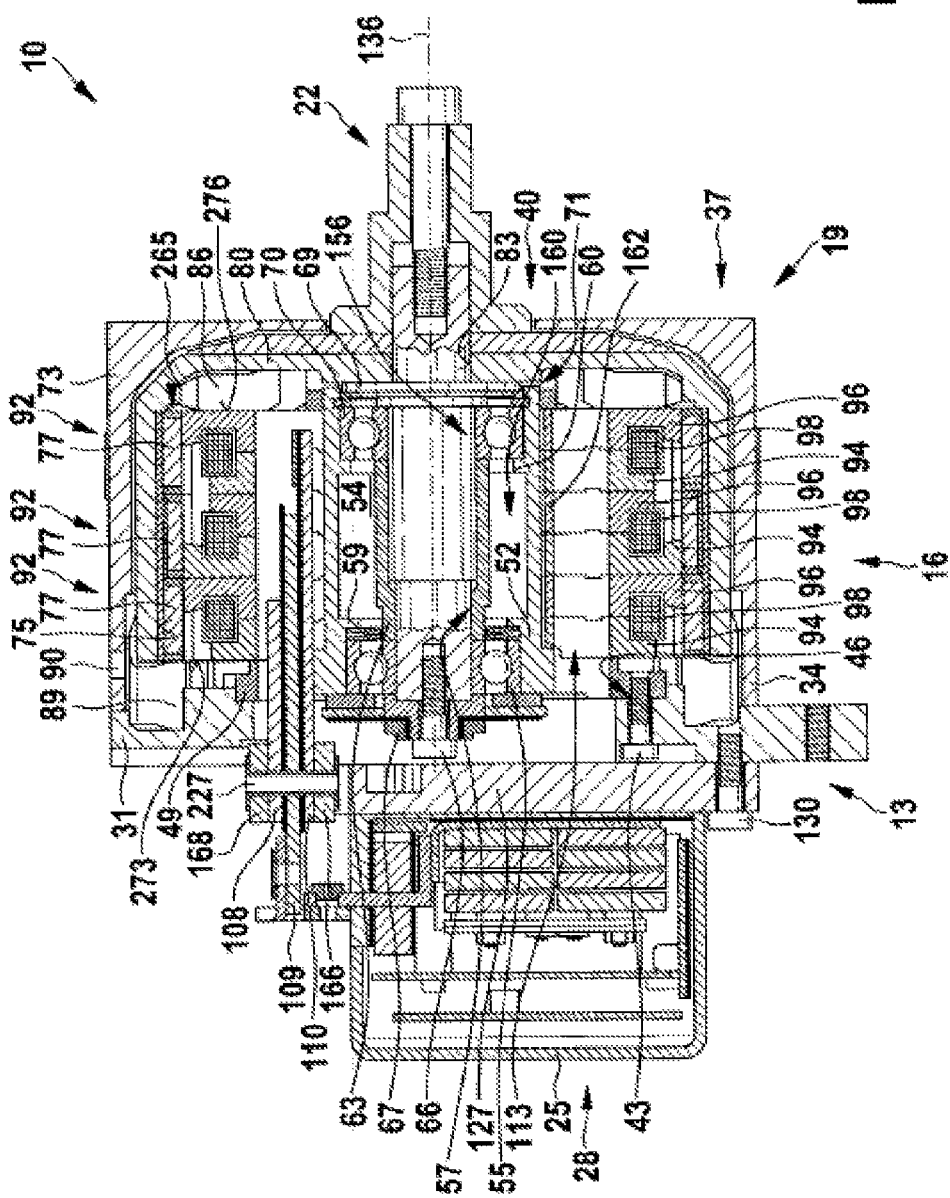
FIG. 1 shows a longitudinal section through a first embodiment of an electric machine.

FIG. 1 illustrates an electric machine with the configuration of a transverse flux machine 10. As is the case for many electric machines, this electric machine also has a stator 13 and a rotor, in the form of a so-called external rotor 16. Both parts are arranged in a housing 19. The external rotor 16 is driven by means of a shaft 22. In this case, the shaft 22 is driven by means of a pulley or a gearwheel or another torque transmission part. Electronics 28, for example a passive rectifier or an active rectifier, are arranged beneath a cover 25 on the left-hand side in FIG. 1.

An approximately pot-shaped housing shell 34, which has a ring-shaped collar 37 with a central opening 40, is supported on a flange 31. The shaft 22 extends through the opening 40.

Furthermore, the stator 13 is also supported on the flange 31. The stator 13 is fastened indirectly to the flange 31 by means of seven screws 43. The screws 43 protrude through in each case one through-opening in the flange 31 and engage in in each case one threaded bore 46 of a further flange 49. This further flange 49 is integrally connected to a central sleeve 52, which likewise performs central tasks.

The sleeve 52 bears, over its inner contour 54, two rolling bearings 55 and 56, which in this case are in the form of deep groove ball bearings. The inner contour 54 has two ring webs 59 and 60. The ring web 60 serves as a stop for the rolling bearing 56. Between the ring web 59 and the rolling bearing 55, in order to produce an axial prestress on the two rolling bearings 55 and 56, a disk spring 57 is clamped between the ring web 59 and the rolling bearing 55. The shaft 22 is mounted fixed in position and rotatably via these rolling bearings 55 and 56. The shaft 22 is placed between the bearing seats for the rolling bearings 55 and 56. A spacer sleeve 63 is pushed onto the shaft 22 between the two rolling bearings 55 and 56, in order that a defined distance is set between the rolling bearings 55 and 56. The two rolling bearings 55 and 56, or their inner rings (not illustrated here in any more detail), are braced with one another and against a shoulder 69 by means of the spacer sleeve 63, a tensioning sleeve 66 and a tensioning screw 67. An outer ring 70 of the rolling bearing 56 is secured in position by an inner securing ring 71.

The shoulder 69 also has the task of protecting the rolling bearings 55 and 56, as well as the task of forming a stop for the external rotor 16. The external rotor 16 has a pot-like configuration. A section 73 in the form of a cylinder lateral surface of the external rotor 16 bears permanent magnets 77 on its cylindrical inner side 75 in three rows arranged axially successively. A type of housing base 80, which rests with a central bore 83 on the shaft 22, adjoins the section 73 in the form of a cylinder lateral surface of the external rotor 16, extending radially inwards at an axial end. A radially acting fan 86 is fastened on an inner side of the housing base 80. A further fan 89, which is in the form of a narrow ring in the radial direction, is fastened on the section 73 in the form of a cylinder lateral surface which is directed towards the electronics 28. This fan 89 rotates in a groove which is incorporated in a front side of the flange 31 which is directed towards the fan 89. Radially outside this fan 89, a series of ventilation openings 90 is arranged all the way round in the housing shell 34.

The stator 13 is arranged radially within the section 73 in the form of a cylinder lateral surface. This stator 13 comprises three individual special ring systems 92. Each ring system 92 has two half-rings 94 and 96, which, between them, accommodate a ring coil as stator winding 98. The stator winding 98 is surrounded or encompassed in each case by two half-yokes 100 and 101, two ring walls 102 and 103 and claw poles 104 and 105; see also FIG. 6A. The claw poles 104 and 105 in this case alternate with one another in the circumferential direction. In this case, an accommodating area 106 for the stator winding 98 is formed. The accommodating area 106 has a specific cross section, delimited by the half-yokes 100 and 101, the two ring walls 102 and 103 and the claw poles 104 and 105. The stator winding 98 with a preformed cross section rests in this accommodating area 106, which is rectangular in this example. The cross section of the stator winding 98 is matched to the cross section of the accommodating area 106.

Arranged in concentrated fashion, three outputs 108, 109 and 110 of the in total three stator windings 98 are located radially inside the stator 13, i.e. between the half-yokes 100 and 101, which in total make up an inner yoke 107, and the sleeve 52. Each output 108, 109 and 110 is in this case associated with a stator winding 98. The three stator windings 98 are star-connected to one another, which will be discussed in more detail further below.

Ventilation channels 113, which are part of a ventilation system which will likewise be described in more detail below, are located radially inside the stator 13, i.e. likewise between the half-yokes 100 and 101 and the sleeve 52.

Figure 2:
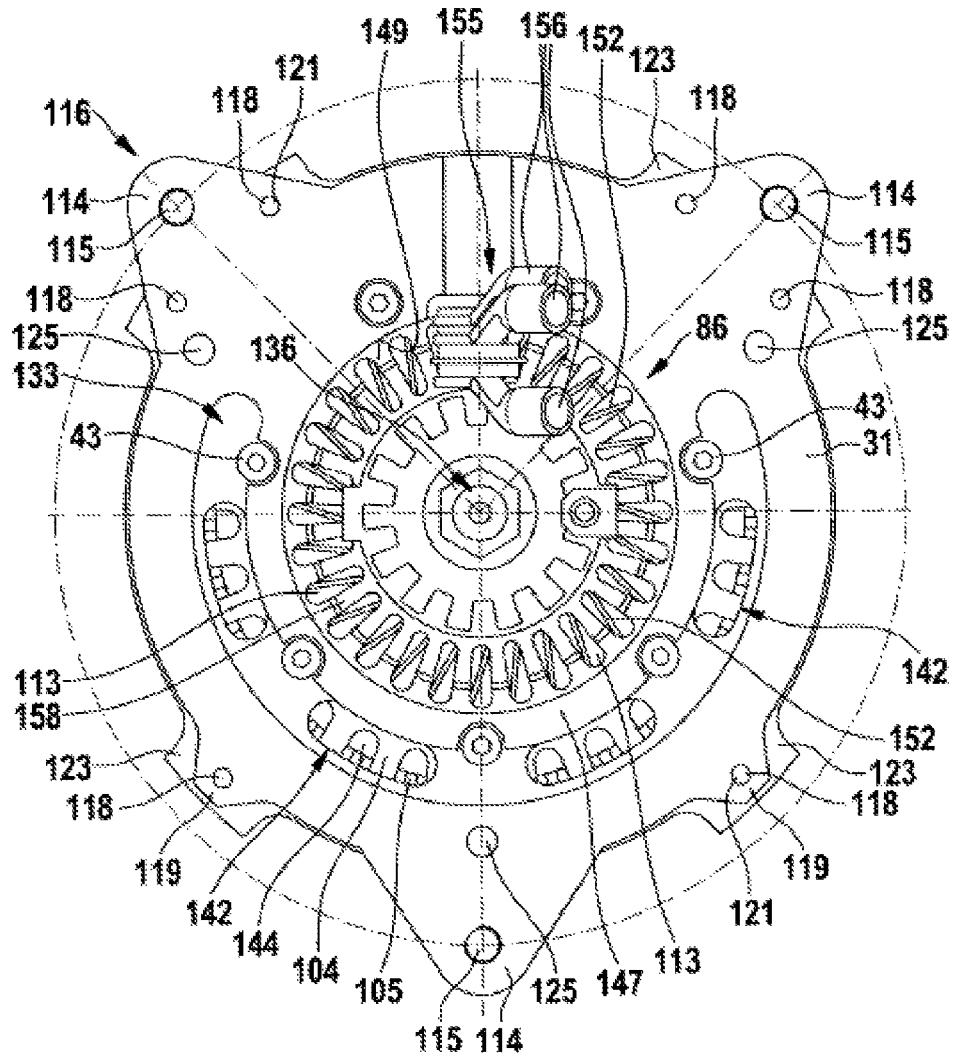
FIG. 2 shows a front view of an electric machine on a flange without electronics.

FIG. 2 shows a front view of the electric machine on the flange 31 with dismantled electronics. The flange 31 has a through-hole 115 for a respective fastening eyelet 114 at the clock positions "half one", "six o'clock" and "half ten". These through-holes 115 are preferably equipped with internal threads 116, as illustrated here, and are used for fastening the electric machine to its surroundings. Six further through-holes 118, of which in each case two times two through-holes 118 are arranged in the fastening eyelets 114 and in each case one through-hole 118 is arranged in individual fastening eyelets 119, are used for fastening the housing shell 34 to the flange 31. For this purpose, correspondingly six tie rods 121, in the form of long screws (see also FIG. 3), are plugged through further through-holes 122, which are incorporated in ring segments 123. By virtue of applying a sufficient torque to the tie rods 121, the housing shell 34 is held reliably in position on the flange 31.

Three threaded bores 125 located at the clock positions "two o'clock", "six o'clock" and "ten o'clock" are used for fastening a cooling plate 127 (illustrated by way of example in FIG. 1) by means of screws 130. The cooling plate 127 itself serves to cool the electronics 28.

Five of the seven screws 43 protrude into a groove 133 in the form of a ring segment, which extends approximately 270° about an axis of rotation 136. Four slots 142 which are likewise in the form of ring segments protrude from a base 139 of the groove 133, through which slots a view of the claw poles 104 and 105 and a casting compound 144 is free. The casting compound 144 covers the stator windings 98. A ring-shaped web 147 delimits the flange 31 radially inwards and delimits a circular central through-opening 149 radially outwards. Inlet openings of the ventilation channels 113 are illustrated radially within the web 147. In the background, fan blades 152 of the fan 86 can be seen through the ventilation channels 113.

In the foreground at the "twelve o'clock" position, three connecting lugs 155 with cable sleeves 156 are illustrated. These connecting lugs 155 serve the purpose of making contact with the three stator windings 98 (see also FIG. 3). In this example, three-phase current can be understood as a specific form of an alternating current. In contrast to the illustration in FIG. 1, the current of the three stator windings 98 can be guided by means of the connecting lugs 155 to so-called "path-building" electronics (for example a passive rectifier or an active rectifier), which are not arranged on the cooling plate 127.

The individual ventilation channels 113 are separated by radial webs 158. These webs 158 protruding from the inner yoke 107 act as cooling ribs, cool the stator 13 and extend from the inner yoke 107 radially inwards. These webs 158 or cooling ribs are integrally formed on the inner yoke 107. The webs 158 shown directly in FIG. 2 are moreover webs 158 which are incorporated in the flange 49. The same arrangement of webs 158 and ventilation channels 113 is also implemented in the half-rings 94 and 96. While the flange 49 merges with a tubular section 160 of the sleeve 52 after the webs 158, when viewed radially from the outside, the webs 158 of the half-rings 94 and 96 merge with a thin ring region 162. The webs 158 or cooling ribs which are spaced apart in the circumferential direction are connected integrally to one another radially on the inside by the ring region 162. In the axial direction, a plurality of ring regions 162 a plurality of half-rings 94, 96 are braced with one another.

Figure 3:
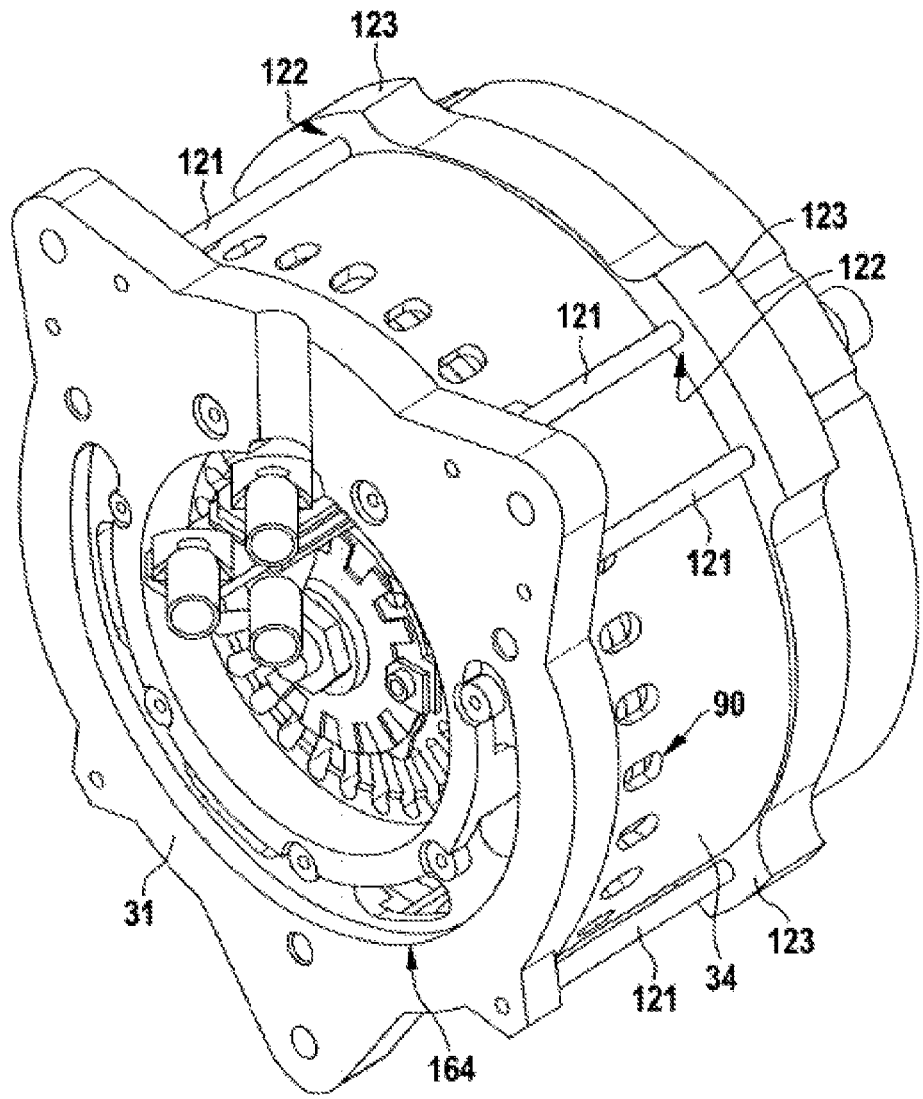
FIG. 3 shows a three-dimensional view of the machine shown in FIG. 2.

FIG. 3 shows the abovementioned ventilation openings 90 over the outer circumference of the housing shell 34. Furthermore, a fan blade 164 of the fan 89 is shown within the ventilation openings 90, in a manner representative of the entire fan 89.

Figure 4:
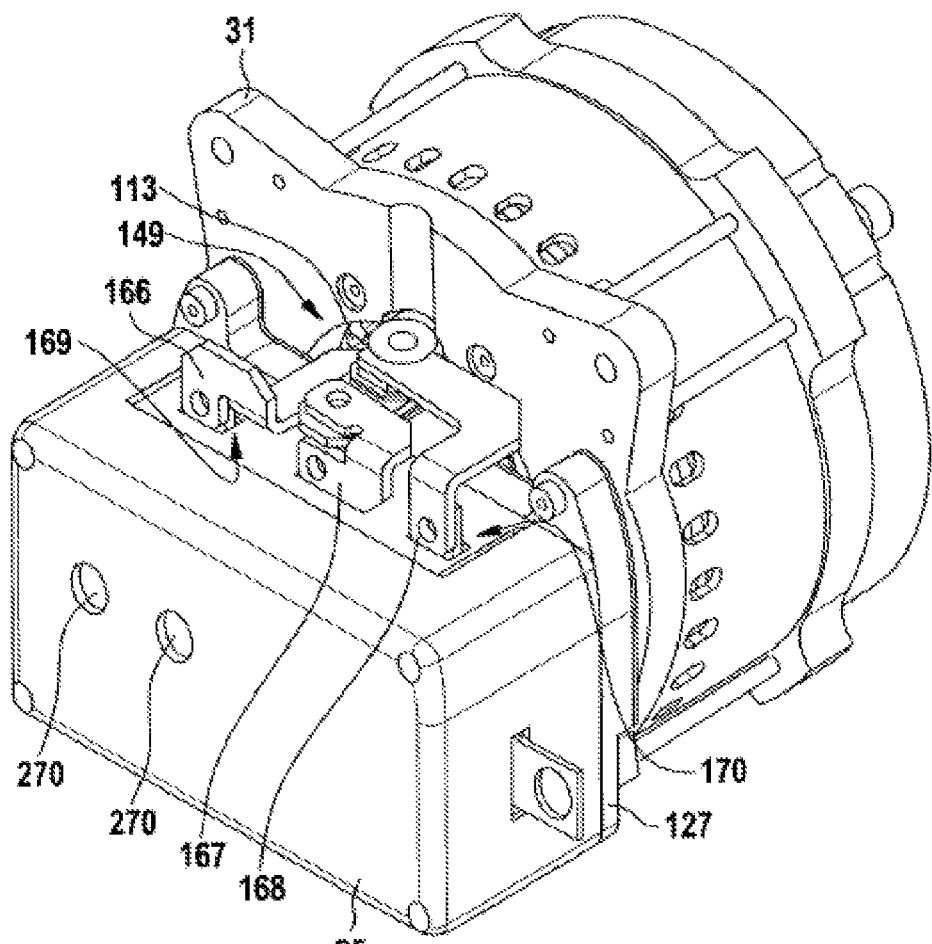
FIG. 4 shows a three-dimensional view of the machine shown in FIG. 1.

Against the background of FIG. 1, FIG. 4 shows the technical solution with built-on electronics. Thus, the current produced by the outputs 108, 109, 110 is conducted via three conductor rails 166, 167 and 168 to the connections 169, 170. A third connection is provided, but this is not illustrated in FIG. 4 because it is hidden by the conductor rail 167. Protruding from the cover 25, a positive connection 173, for example for supplying power to a power supply system of a motor vehicle (not illustrated) is shown.

In addition, the connecting lugs 155 can also be fastened at the outputs 108, 109, 110.

Figure 5:
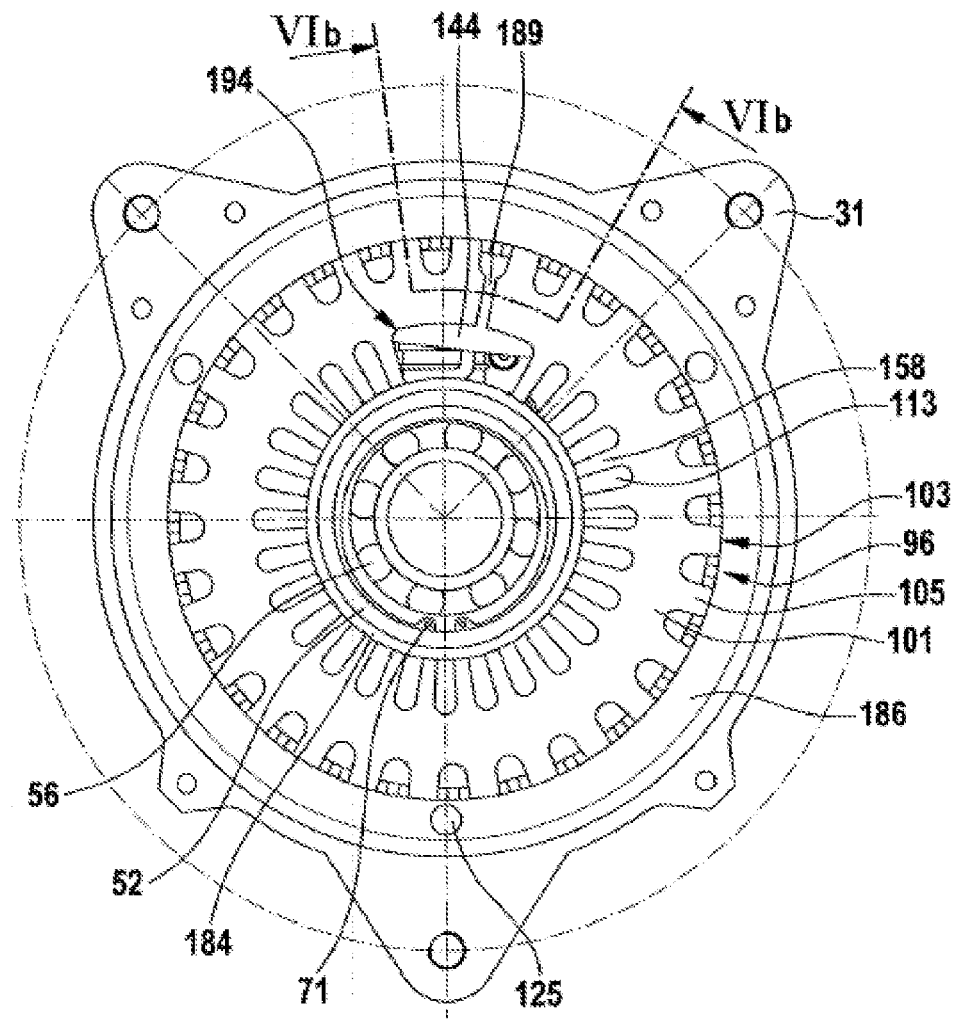
FIG. 5 shows a rear view of the electric machine on a flange with dismantled electronics.

FIG. 5 shows a rear view of the electric machine on the flange 31 with the electronics 28 dismantled or not fitted and also without the housing shell 34 and without the shaft 22 fitted. It can clearly be seen that the webs 158 are integrally formed on the half-ring 96. The same also applies to the other half-ring 94. This integral formation of this structure comprising the webs 158 and the ventilation channels 113 with the ring region 162 is technically less complex when the material from which the half-rings 94 and 96 are manufactured is a so-called ferromagnetic powder composite material (SMC, i.e. "soft magnetic composite"). In view of the fact that this material is at present very costly, the structures comprising the webs 158 and the ventilation channels 113 can be produced in a less complex manner, which will be discussed in more detail further below.

Figure 6A:
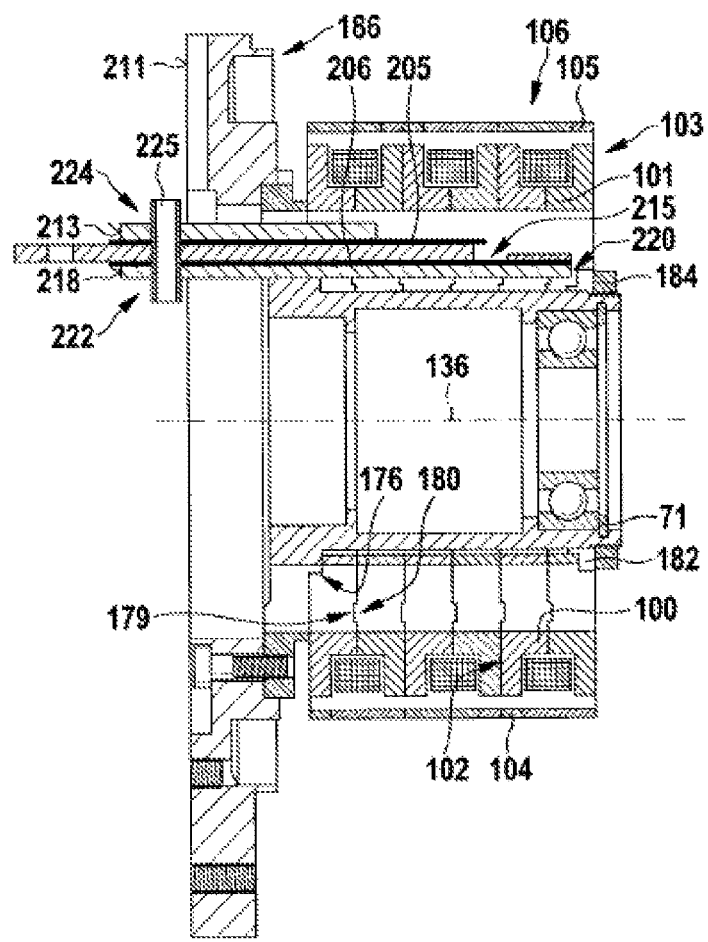
FIG. 6A shows a longitudinal section through the stator.

As can already be seen from FIG. 1, the half-rings 94 and 96 are pushed onto the sleeve 52 with the stator windings 98 until they hit against the flange 49. The half-rings 94 and 96 are in this case centered by a recess 176 (FIG. 6A). By virtue of two different form-fitting elements in the form of knobs 179 and corresponding depressions 180, the half-rings 94 and 96 are centered with respect to one another. A pressure and centering ring 182 firstly results in an assembly comprising the half-rings 94 and 96 being centered around the sleeve 52 and a compressive force (generated by a tightened shaft nut 184) is applied to the SMC material without or virtually without a transverse force. A corresponding transverse force would be transmitted to the SMC material if the shaft nut 184 were to transmit the frictional force produced by it being tightened between itself and a body to be clamped directly to the SMC material.

The rolling bearing 56 is inserted into the sleeve and secured by the inner securing ring 71. The flange 31 has a recess 186 in the outer edge region on that side of said flange which is directed towards the stator 13. This recess 186 serves the purpose of centering a housing shell 34 (FIGS. 5 and 6A).

Figure 6B:
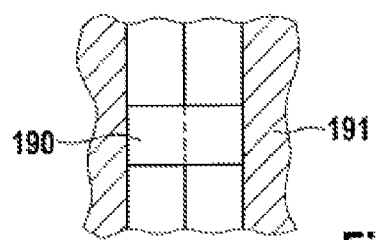
FIG. 6B shows a detail of the stator shown in FIG. 6A.

On its side directed towards the viewer, i.e. on the side pointing away from the flange 31, the half-ring 96 has a groove 189. This groove serves the purpose of being able to allow the casting compound 144 to flow between the two radial sides of the half-rings 94 and 96. FIG. 6B shows a detail, in this case a section through two half-rings 94 and 96. As can be seen in said figure, the two half-rings 94 and 96 have a notch 190 and 191, respectively, whose profiles run radially inwards, are at right angles and supplement one another to form, overall, a rectangular overall profile. Special connecting parts of the stator winding 98 run in these notches 190 and 191. Owing to the corresponding similarity, all of the half-rings 94 and 96 have a notch 190 and 191, respectively.

Figure 7:
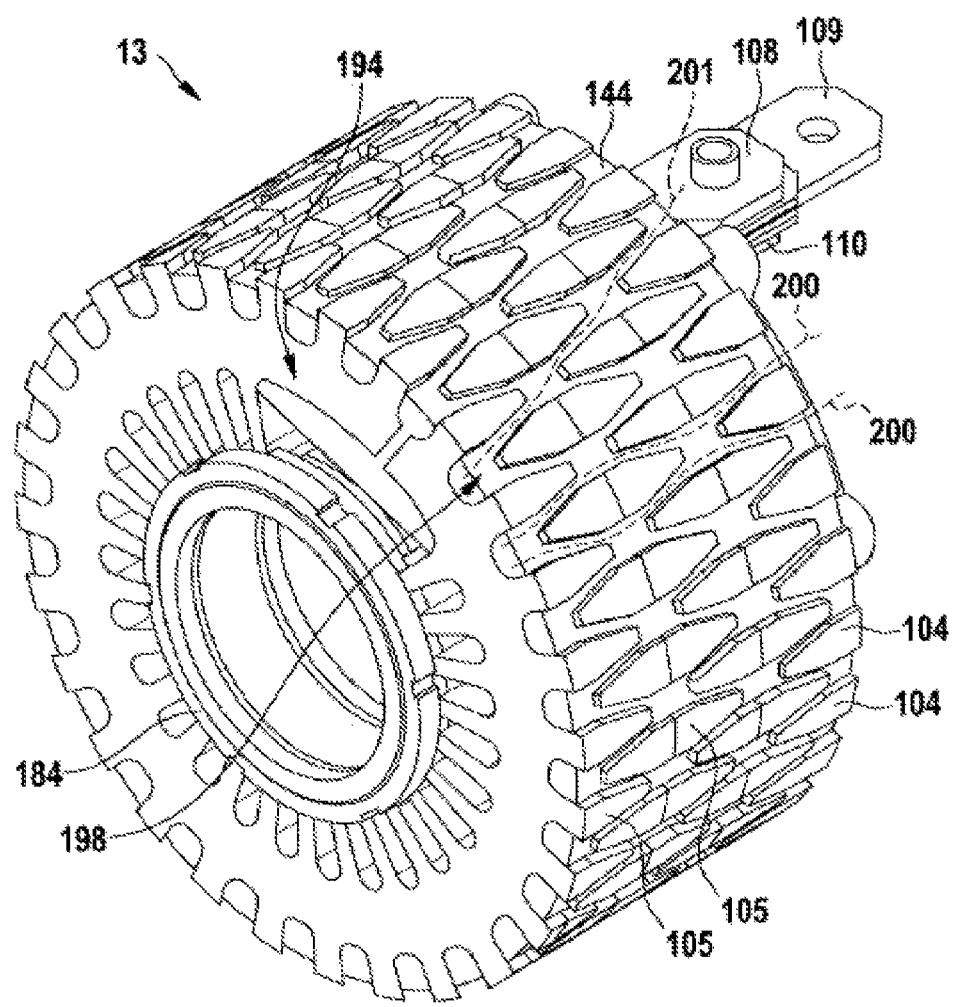
FIG. 7 shows a three-dimensional view of the stator.

FIG. 7 shows a three-dimensional view of the stator 13. As can already be seen from FIG. 5, the half-rings 94 and 96 have a further notch 194, at which there are no webs 158. The outputs 108, 109 and 110 are guided axially in the region of or in this notch 194 (see also FIG. 1 and FIG. 6A).

The claw poles 104 and 105 of each ring system 92 engage alternately in claw pole gaps 196 and claw pole gaps 198, respectively, between the respective other claw poles. The claw pole gaps 196 are between claw poles 104, and the claw pole gaps 198 are between the claw poles 105. As can be seen from FIG. 7, a claw pole 104 of a ring system 92 bears against a claw pole 105 of another ring system 92. The claw poles 104 and 105 of the three ring systems 92 are in this case arranged in such a way that undulating paths 200 and helical paths 201 are produced between the claw poles 104 and 105. These paths 200 and 201 serve the purpose of allowing cooling air to pass through.

Figure 8:
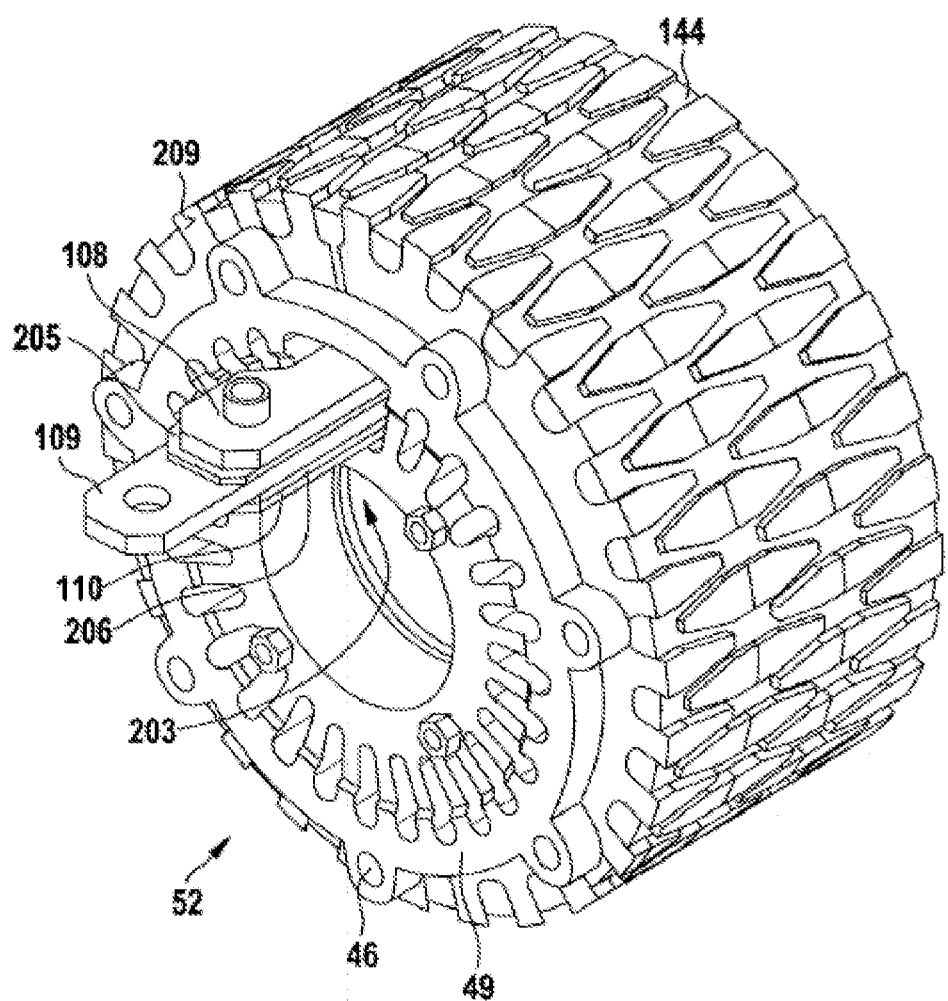
FIG. 8 shows a further three-dimensional view of the stator shown in FIG. 7.

FIG. 8 shows a further three-dimensional view of the stator 13. The three connections 108, 109, 110 of the three stator windings 98 extend through an opening 203 in the flange 49 of the sleeve 52. In each case one insulating layer 205 or 206, which is produced from a polyamide film, for example, is located between the three connections 108, 109, 110, i.e. between the connection 108 and 109 and between the connection 109 and 110. As is also apparent in this regard from FIG. 1, functional sections of the connections 108, 109, 110 are of different lengths: measured from the first end face 209, which is directed towards the flange 31, those parts or sections of the connections 108, 109, 110 which are directed towards the stator windings 98 have approximately a ratio of 1:2:3 with respect to one another. That is to say that the corresponding section of the connection 108 is only approximately a third as long as the corresponding section of the connection 110. On the other hand, those sections of the connections 108, 109, 110 which are directed towards the electronics 28 have a different ratio with respect to one another, for reasons of space. Thus, the lengths of the sections of the connections 108, 109, 110 from the end face 211 illustrated in FIG. 6A is approximately 3:5:3. That is to say that the section of the central connection 109 protrudes beyond the two other sections of the two other connections 108 and 110.

The insulating layer 205 extends at least from the outermost end face 213 of the connection 108, said end face 213 pointing away from the stator 13, as far as at least the outermost end face 215 of the connection 109, said end face 215 pointing away from the end face 213 of the connection 108.

In more general terms, the insulating layer 205 extends between two directly adjacent connections 108 and 109 at least over the length which is between two end faces 213 and 215 pointing away from one another.

The insulating layer 206 extends at least from the outermost end face 218 of the connection 110, said end face 218 pointing away from the stator 13, as far as at least the outermost end face 220 of the connection 110, said end face 220 pointing away from the end face 218 of the connection 110.

In more general terms, the insulating layer 206 extends on or at the connection 110, which makes contact with the stator winding 98, which is furthest removed from the end face 209 of the ring system 92, which is positioned closest to a connection side 217 of the stator 13, over at least the entire axial length of the connection 110.

The three or the connections 108, 109, 110 are provided with a through-hole 224 on the side pointing away from the stator windings 98 at a point 222 which overall overlaps with respect to the connections 108, 109 and 110. The insulating layers 205 and 206 are likewise perforated at this point 222. A sleeve 225 consisting of an insulating material is plugged into the five holes. This sleeve 225 protrudes beyond the structure comprising the connections 108, 109, 110 and insulating layers 205 and 206 on both sides; see inter alia FIG. 6A and FIG. 8. The conductor rail 168 which is centered by the sleeve 225 rests on the upper side of this structure, i.e. on the connection 108; the conductor rail 166 centered by the sleeve 225 rests on the lower side of this structure, i.e. on the connection 110 (FIG. 1 and FIG. 4). Two insulating disks 227 resting thereon form bottom layers or top layers for a fastening means such as, for example, a screw and a nut, which are not illustrated here and press the structure with high contact stability.

Figure 9:
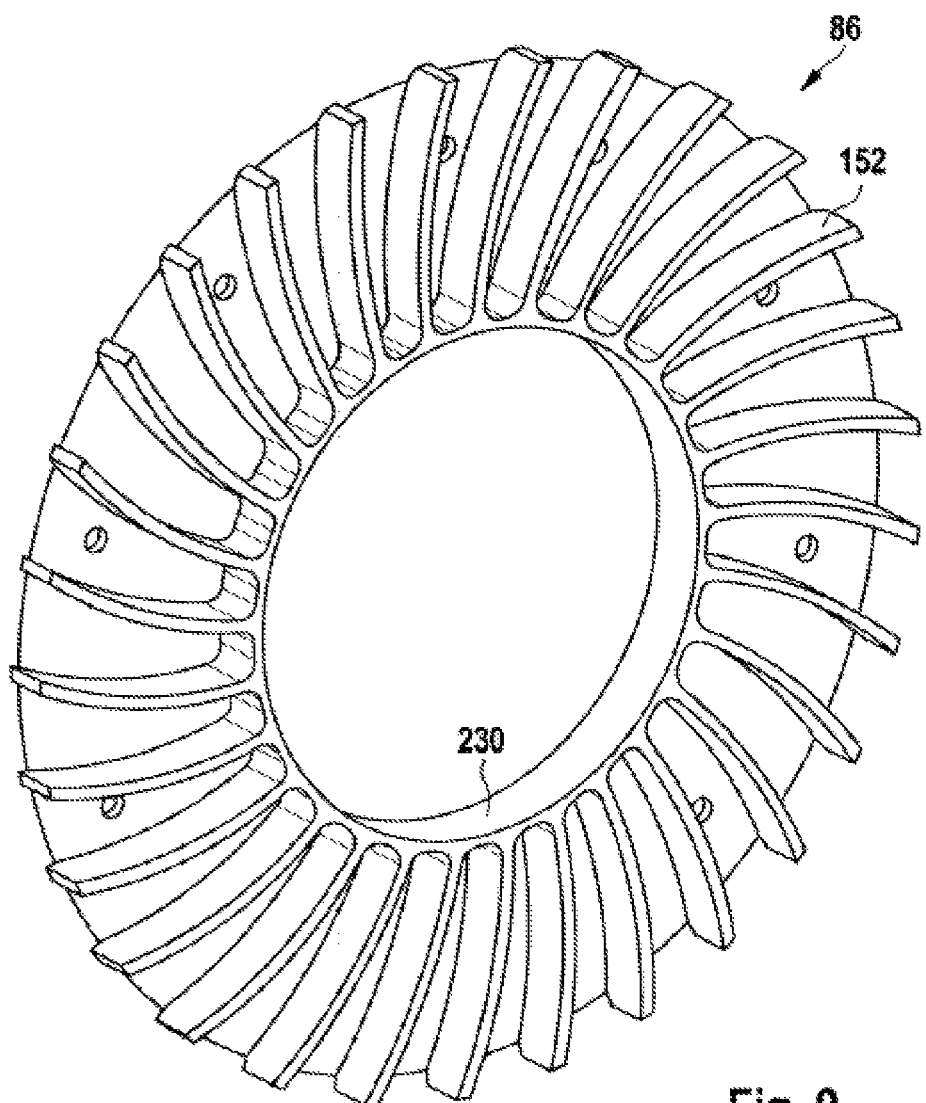
FIG. 9 shows a fan.

FIG. 9 illustrates the fan 86 illustrated in FIG. 1 as an individual part in a three-dimensional view. This fan 86 is fastened on the inner side of the housing base 80 of the external rotor 16 by means of a few fastening elements. The fan 86 has a central opening 230, whose diameter is greater than an outer diameter of the shaft nut 184 (FIG. 1).

Figure 10:
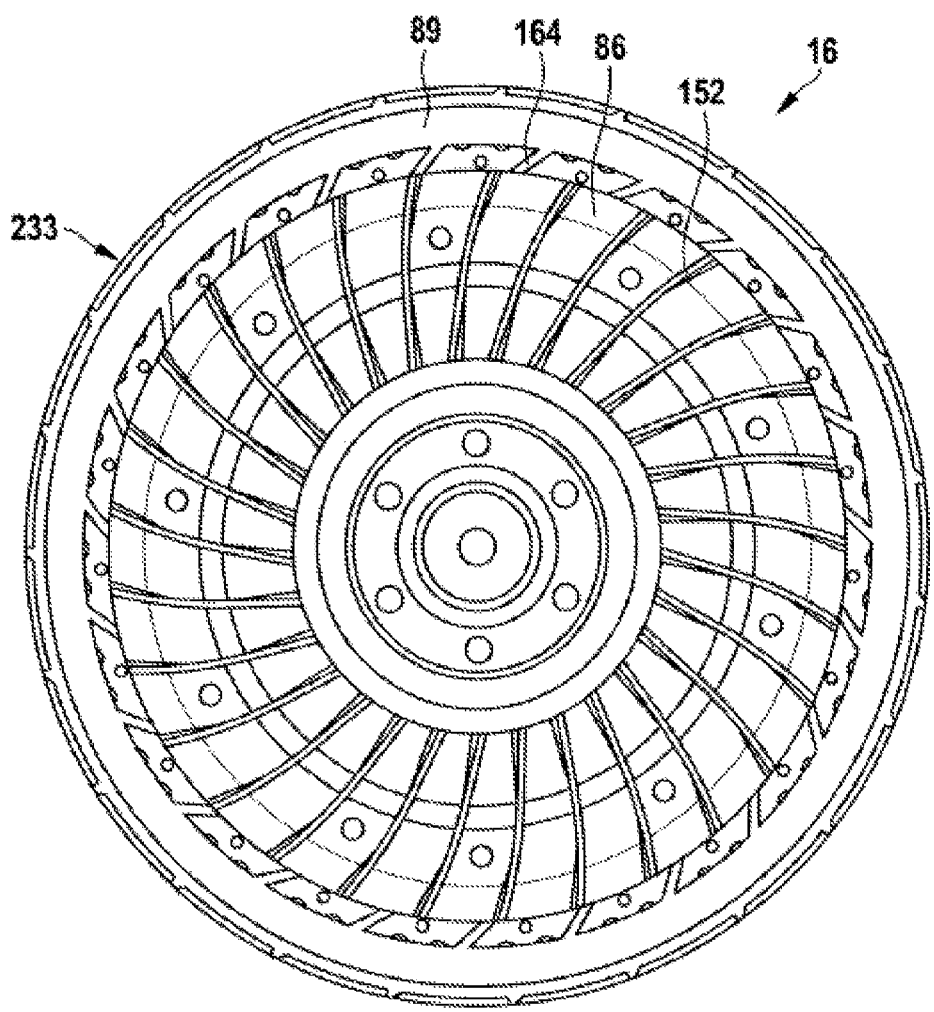
FIG. 10 shows a view into a cavity of an external rotor.
Figure 11:
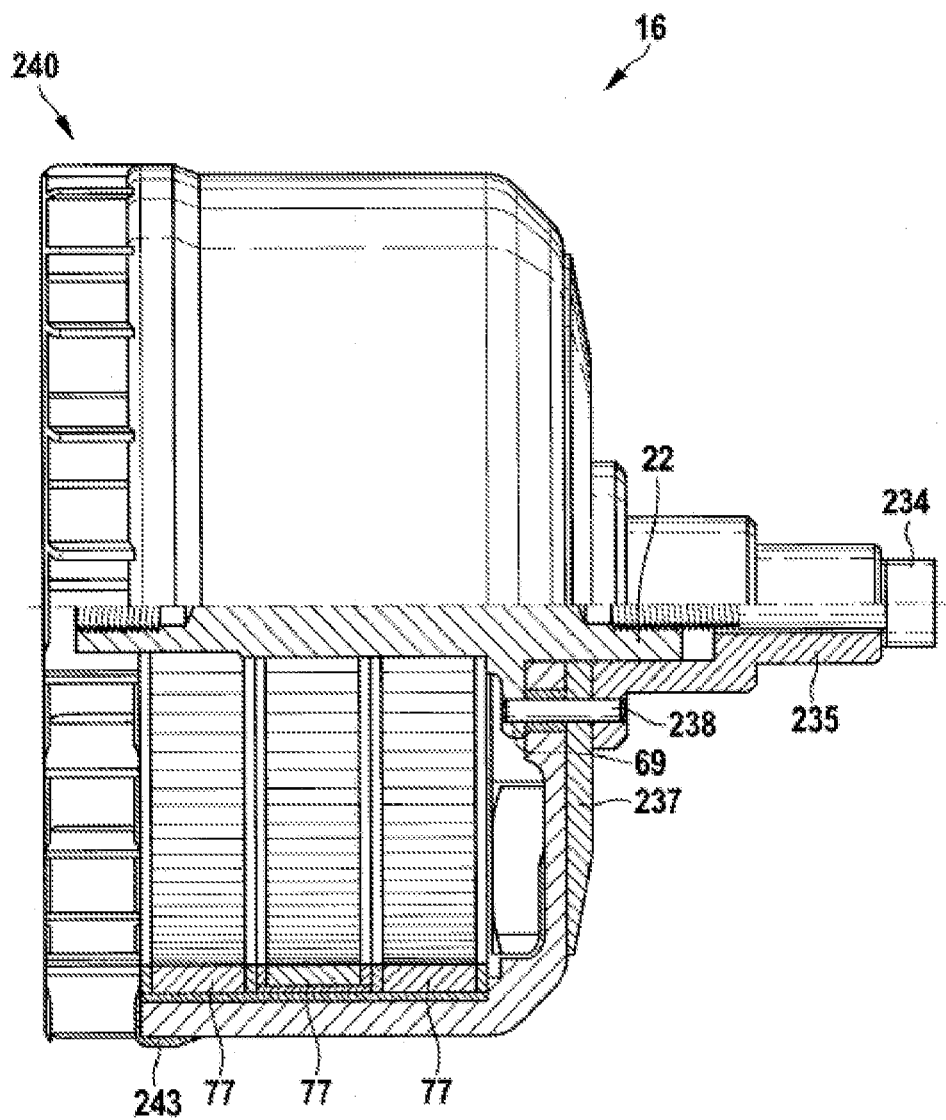
FIG. 11 shows two views of the external rotor with an external view being illustrated in the upper half of the picture and a longitudinal section view being illustrated in the lower half of the picture.

FIG. 10 shows a view into the cavity of the external rotor 16. The illustration clearly shows the fan blades 152 of the fan 86 and inner ends of the fan blades 164 of the fan 89, which are prevented from bending radially outwards by a stabilizing ring 233. The external rotor 16 is constructed from various component parts (see also FIG. 11): the housing base 80 is pressed against the shoulder 69 of the shaft 22. In the process, a screw 234 which is screwed into a shaft end presses a sleeve 235 against a stabilizing plate 237, which in turn transmits the compressive force onto the housing base 80. In order that the shaft 22, the plate 237 and the housing base 80 can be fitted in the correct position with respect to one another, dowel pins 238 are inserted into bores in the shoulder 69. The housing base 80, the plate 237 and the sleeve 235 are positioned onto these dowel pins 238.

The permanent magnets 77 are fastened on the substantially cylindrical inner side. The fan 89, which is produced from plastic, for example, is plugged on at that end 240 of the section 73 in the form of a cylinder lateral surface which is remote from the housing base 80, by means of a snap-action connection. For this purpose, a ring section 243 which is integrally formed on the fan 89 engages around the cylindrical outer side of the section 73 in the form of a cylinder lateral surface.

Figure 12:
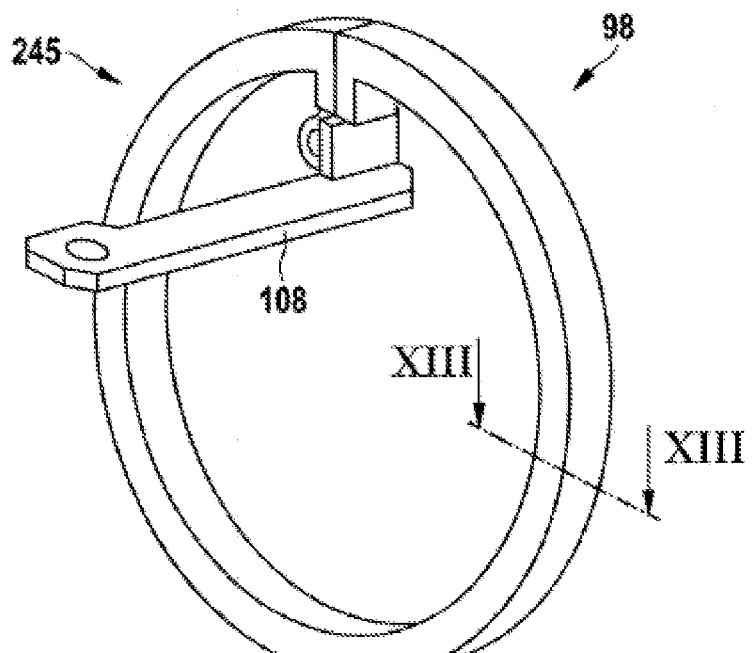
FIG. 12 shows a three-dimensional view of a stator winding.
Figure 13A:
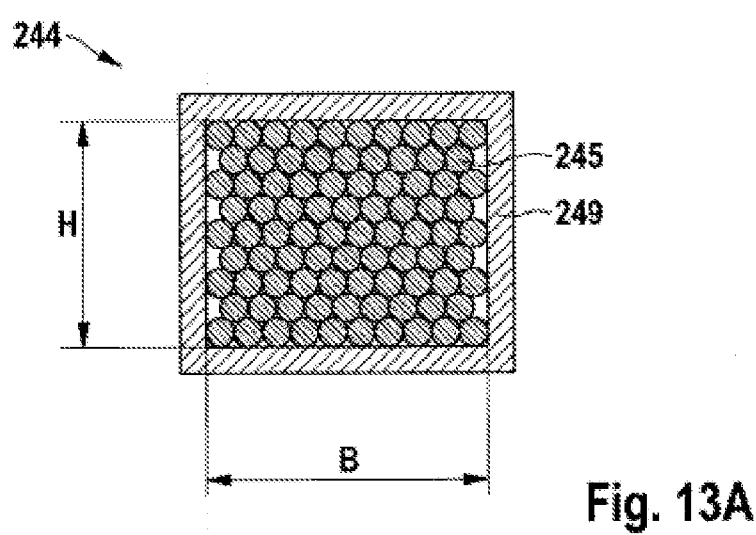
FIG. 13A shows a cross section through the stator winding.

FIG. 12 shows a three-dimensional view of a stator winding 98, in this case the stator winding 98 which is positioned closest to the connection side 217. The stator winding 98 comprises precisely one turn 245. However, the stator winding 98 is in this case in the form of a litz wire 244, the litz wire 244 having a plurality of individual wires 245 (FIG. 13A). In accordance with a specific design, provision is made for the litz wire 244 to have 1000 wires with a diameter of in each case 0.2 mm. All of the individual wires 245 of the litz wire 244 are thus wound once (slightly less than 360°, i.e. not quite)360°. The individual wires 245, i.e. each individual wire cross section consisting of copper, for example, of the litz wire 244 are also insulated with respect to one another by a layer of enamel as insulating layer 247. Then, the litz wire 244 is additionally insulated at its outer circumference, with this being performed by banding 249, for example. The litz wire 244 is first prepared in linear form. The individual wires 245 of the litz wire 244 are then all next to one another linearly. If it were then desired to wind such a linear banded litz wire 244, this would result in considerable non-uniform changes in length and internal stresses (between the individual wires) over the cross section of the litz wire 244. Alternatively, the individual wires 245 of the litz wire 244 can also be embodied without insulation 247. Then, the possible disadvantage of relatively high current displacement stands against the possible advantage of relatively high copper cross section. In the exemplary embodiment described here, the litz wire 244 has a current displacement of 1.14 at 10 000 revolutions per minute.

Figure 16:
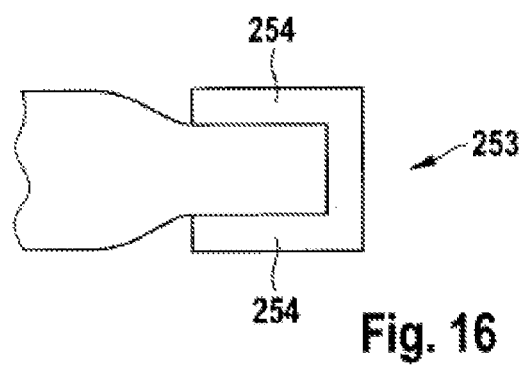
FIG. 16 shows a detail of the stator winding, FIGS. 17a) to g) show various method steps for producing a stator winding, FIGS. 18a) to e) show two different stator windings, different method steps for producing a stator winding and two different cross sections through the stator windings.

Following this step, the litz wire 244 is circumferentially compressed in the region of an intended abutment (the two ends of the litz wire 244 are opposite one another there) and the litz wire 244 is provided with two straight end faces. In the region of said end faces, the insulating layer 247 is removed and the wires are connected to one another by a solder. The stator winding 98 now has an open circular ring form of approximately 360°, with the stator winding 98 having two mutually opposite ends 250, 251, the end 251 with a connection part 108 and the end 250 with a connection part 253 (eyelet connection) being cohesively connected to one another. In this case, an end 250, 251 is connected to a connection part 108, 253 in such a way that a rim 254 of a connection part 108, 253 surrounds the end (FIG. 16). The connection part 108, 253 is in this case pressed against the end 250, 251 while a solder for the cohesive connection is still fluid. Furthermore, an insulating material 256, for example an insulating plate, is introduced between the connection part 108 and the connection part 253 (eyelet connection) in order that no short circuit is produced between the connection part 108 and the eyelet connection 253. Then, the stator winding 98 is banded. Preferably, in the process a neck section 258 is also banded. This neck section 258 comprises, both of the connection part 108 and the connection part 253 (eyelet connection), in each case one section which protrudes radially inwards. This neck section 258 protrudes into the notches 190 and 191 in the fitted machine (see also FIG. 6B).

Figure 17A:
Figure 17B:
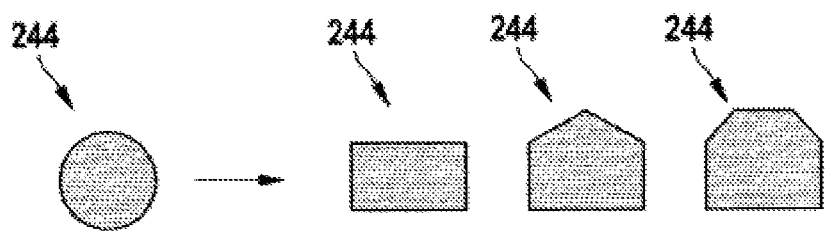
Figure 17C:
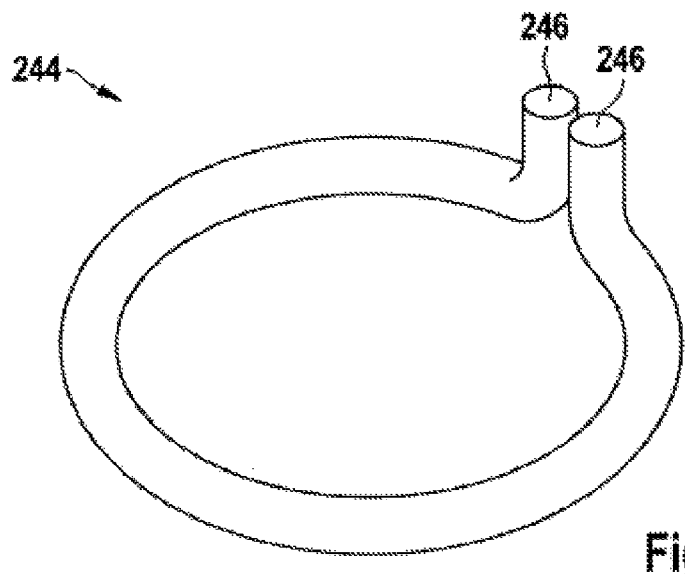
Figure 17D:
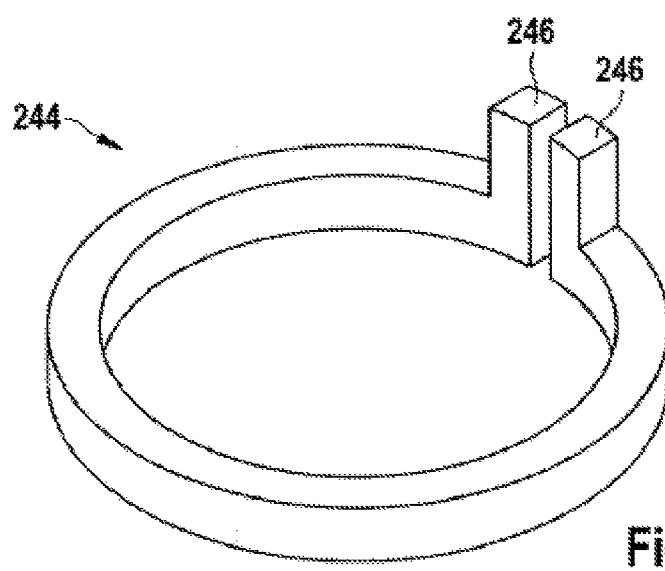
Figure 17E:
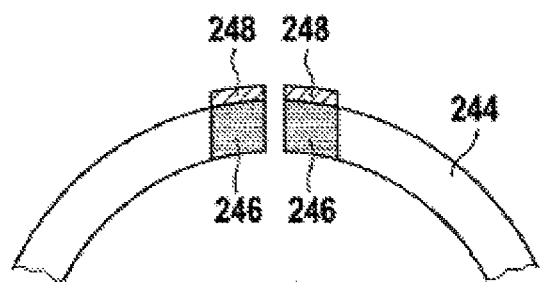
Figure 17F:
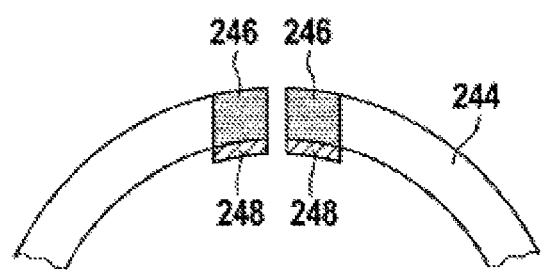
Figure 17G:
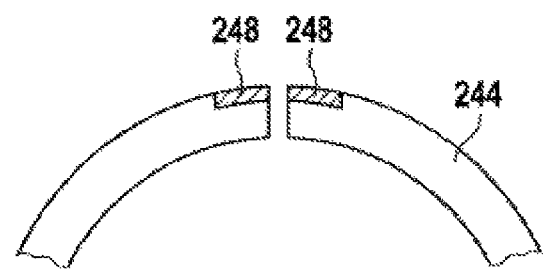

As part of the production method, a plurality of method steps are provided. First, a litz wire 244 is provided (FIG. 17a)). In a further step, the litz wire 244 is compacted, i.e. the litz wire 244 is provided approximately with a cross section which corresponds to the stator winding 98 (FIG. 17b)). By way of example, three different form cross sections after compacting or embossing of the litz wire 244 are illustrated in FIG. 17b). During this method step, bundling of the litz wire 244 is expedient (possibly even by means of possibly only one banding) in order to avoid any movement of the wires, in particular in the following winding step. In FIG. 17c) below, further embodiments of the litz wire 244 are illustrated, in which not only the actual turn section is embossed, but also both ends 246 which extend in addition in the axial direction. While FIG. 17c) shows a litz wire 244 with a round cross section, the litz wire in FIG. 17d) has a rectangular cross section. FIG. 17e) illustrates a litz wire 244 or stator winding 98 which has been embossed with a rectangular form, with two laminations 248 as connections having been soldered or welded onto a radial outer side or the two ends 246 of the litz wire 244. FIG. 17f) illustrates a litz wire 244 or stator winding 98 which has been embossed with a rectangular form, with two laminations 248 as connections having been soldered or welded onto a radial inner side or the two ends 246 of the litz wire 244. FIG. 17g) illustrates a litz wire 244 or stator winding 98 which has been embossed with a rectangular form, with two laminations 248 as connections having been soldered or welded onto a radial outer side or the two ends 246 of the litz wire 244. In this case, the litz wire 244 has been embossed in advance in such a way that a notch has been embossed into the annular cross section of the stator winding 98, with the laminations 248 having been fitted into said notch.

With reference to FIG. 13A, in the exemplary embodiment a stator winding 98 has an unbanded cross section A1 with a radial height H in the direction towards an axis of rotation of the external rotor 16 and an axial width B in the direction of the axis of rotation of the external rotor 16. In the example, B is approximately 10 mm and H is approximately 7 mm. The unbanded cross section is therefore approximately 70 mm². An individual wire of the litz wire 244 has a cross section A2 of $0.1^2 * \Pi$ mm² and therefore approximately 0.0314 mm². A ratio A1/A2 is in this case approximately 2228. In the context of the design of the stator winding 98, provision is made for the ratio in a first approximation to be less than 2500, and in a further approximation to be less than 2000 or less than 1500.

Figure 13B:
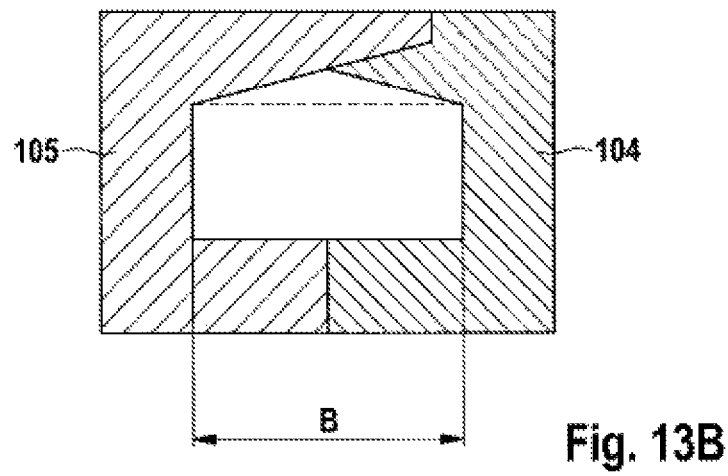
FIGS. 13B and 13C show further possible cross sections through the stator winding.
Figure 13C:
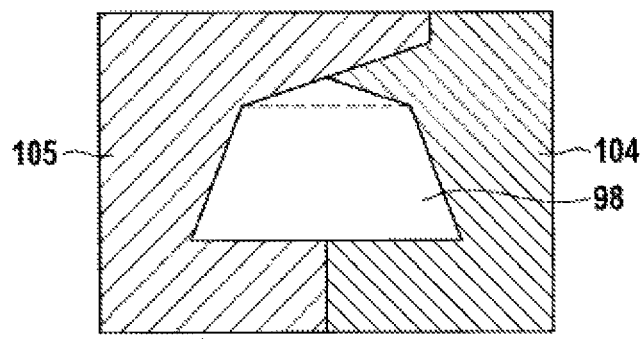

As a further ratio, a quotient of the cross section A1 and a circumference U of an individual wire of the litz wire 244 can be determined. A quotient A1/U of approximately 111 mm results from the example, where U is equal to the product of $\Pi * 0.2$ mm. In a first approximation, it is desirable for the ratio A1/U to be greater than 40, and in a second approximation greater than 80, preferably greater than 120. FIG. 13B illustrates an alternative cross-sectional form for the stator winding 98. This cross-sectional form is a total area ("house with pitched roof" form) comprising a rectangle as in FIG. 13A and a triangle on top. The triangle represents a gain with respect to the cross-sectional form in FIG. 13A resulting from optimized matching of the accommodating area radially beneath the claw poles 104 and 105. In FIG. 13C, a trapezoid is provided as further cross-sectional form of the stator winding 98 as a basic shape, with the sloping faces being oriented substantially in the axial direction. In addition, the trapezoidal form can in total be supplemented by a triangular cross-sectional area beneath the claw poles 104 and 105.

Figure 14:
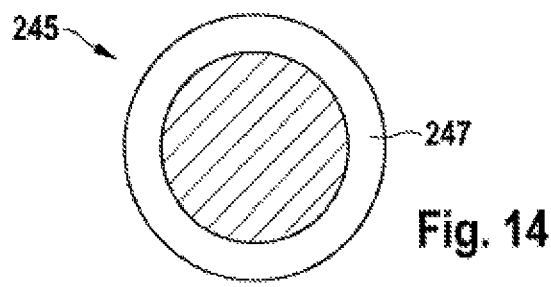
FIG. 14 shows a cross section through a wire of a litz wire.
Figure 15:
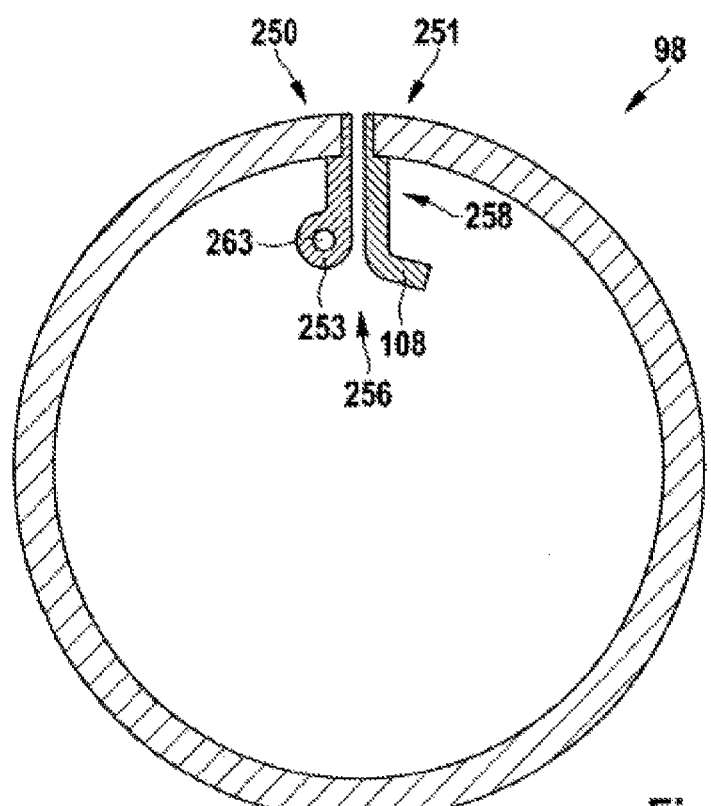
FIG. 15 shows a further cross section through the stator winding.
Figure 18A:
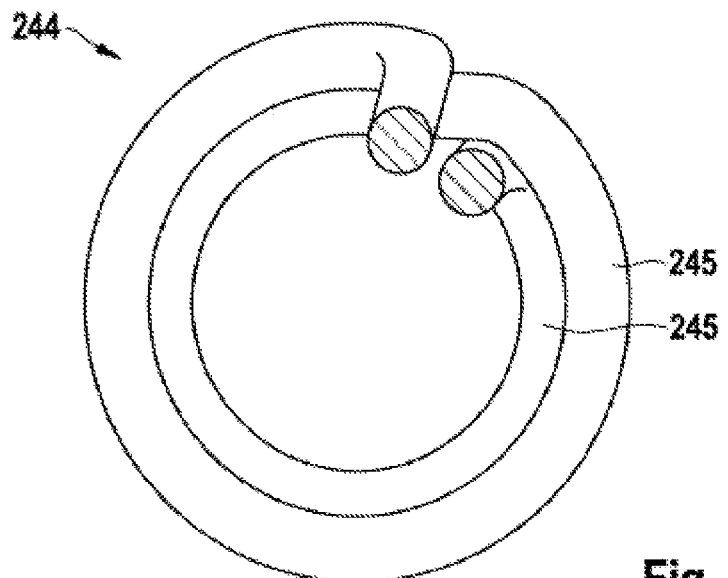

A further exemplary embodiment of a stator winding 98 is shown in FIG. 18a). This stator winding 98, in contrast to the previously described variant, is a stator winding 98 comprising a litz wire 244 with more than only one turn 245. This has the advantage that the current displacement is further reduced. Furthermore, greater flexibility as regards the matching of the number of conductors in the stator winding 98 is provided. In addition, optimum use can be made of the so-called winding window. As already described in respect of FIG. 17a), first a winding phase of litz wire 244 comprising a large number of insulated individual wires 245 (FIG. 14) is provided. This winding phase is then insulated, for example by means of banding 249 (FIG. 13A). The winding phase is arranged in a plurality of turns 245 prior to or after the insulation is provided (see also FIG. 18a) and FIG. 18b)) (forms in ring form, further exemplary embodiment). In FIG. 18a), the turns 245 are wound or layered radially (axially in FIG. 18b)) one on top of the other. FIG. 18c) is a schematic illustration showing individual steps. In step S1, the insulated litz wire 244 is first compressed in order to flatten the litz wire 244 (axial direction); preferably an inner diameter of the stator winding 98 or the litz wire 244 is already preset. Then, the flattened litz wire 244 is shaped (step S2); possibly not only an outer diameter but also the inner diameter is adjusted or shaped. Then, the stator winding 98 or the litz wire 244 is embossed, with the result that the width B is also set (step S3). Possibly, in a further step S4, a fixed structure is then produced, i.e. the stator winding 98 or the litz wire 244 is coated or impregnated with a preferably thermally curable resin (baked enamel), possibly heated in a form and thus a solid stator winding 98 is produced.

Figure 18B:
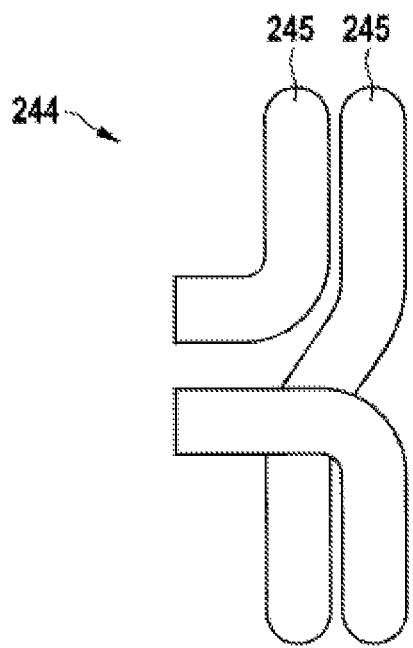
Figure 18C:
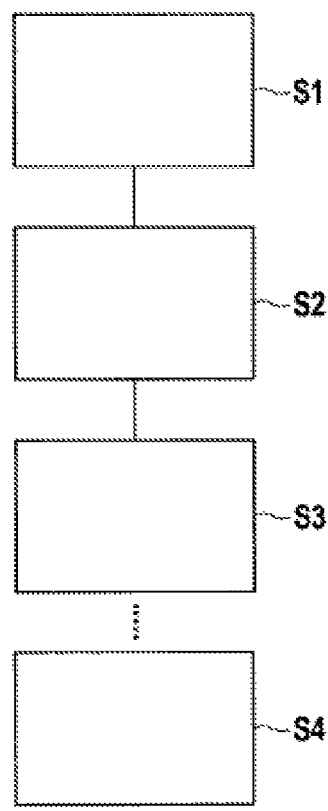
Figure 18D:
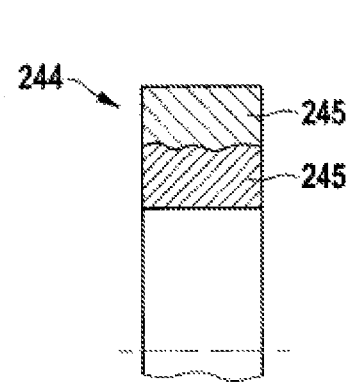

FIG. 18*d*) shows a possible cross section through the stator winding 98 or the litz wire 244, as is illustrated by the winding process shown in FIG. 18*a*) and is produced after compacting or embossing.

Figure 18E:
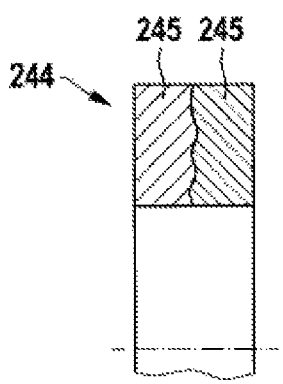

FIG. 18*e*) shows a possible cross section through the stator winding 98 or the litz wire 244, as is illustrated by the winding process shown in FIG. 18*b*) and is produced after compacting or embossing.

A stator winding 98 for a transverse flux machine 10 is therefore disclosed, wherein the stator winding 98 is in the form of a litz wire 244 and the litz wire 244 has a plurality of individual wires 245, the stator winding 98 being in the form of a coil with more than one turn 245. Finally, prior to or following curing, connections are fitted to the stator winding 98 in one of the described ways.

A method for producing a stator winding 98 comprising a litz wire 244 is thus disclosed, wherein first a litz wire strand is provided and, in later steps S1, S2, S3, the stator winding 98 is shaped into a ring form, insulated and a cross section of the stator winding is reshaped. Provision is made for more than only one turn to 245 to be wound in a circumferential direction.

Provision is furthermore made for the stator winding 98 to be coated with a curable material, preferably resin or baked enamel, and later for this material to be cured.

Figure 19:
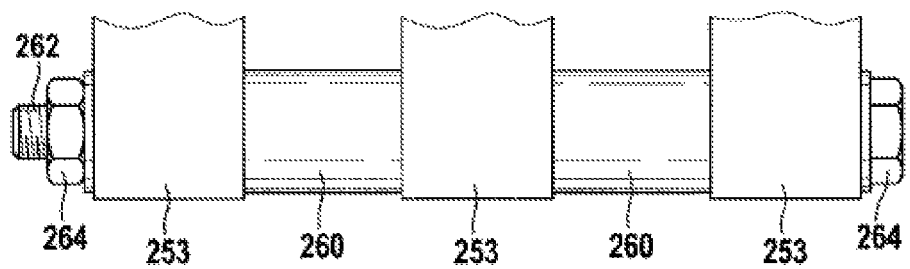
FIG. 19 shows three connection parts of the stator windings which are star-connected.

FIG. 19 illustrates three connection parts 253 of the three stator windings 98 arranged one after the other. In this case, these connection parts are the parts which act as eyelet connection. The three connection parts 253 are spaced apart from one another. In each case one metal bush 260 is located between two connection parts 253. A screw bolt 262 of a screw 264 is plugged through the connection parts 253 and the bushes 260. The connection parts 253 and the bushes 260 are braced with one another, with the result that an electrical connection is provided between connection parts 253 and bushes 260. This arrangement is the neutral point of the three stator windings 98. A transverse flux machine is therefore disclosed, wherein in each case one of the connections of the stator windings 98 has a hole 263 and these connections or one of the connection parts 253 of the stator windings 98 are arranged axially one behind the other in the direction of rotation of an external rotor 16, these connection parts 253 being mechanically and electrically connected to one another by a bolt (screw bolt 262) positioned in the holes 263 and a neutral point thus being formed. Against the background of a generalization: this arrangement, either so as to form the neutral point or so as to pass out the connections 108, 109 and 110, is independent of the selection of the embodiment of the stator winding 98. It is merely important that, in order to form the neutral point, one end of a stator winding 98 is embodied with a connection part 253, with preferably all of the stator windings 98 being embodied in such a way. In order to pass out the connections 108, 109 and 110 or to arrange said connections with respect to one another, provision is merely made for one end of the stator windings 98 to be connected to one of the connections 108, 109 and 110.

The text which follows will describe the cooling of the transverse flux machine 10, which is described in FIGS. 1 and 4 (with attached electronics). By virtue of a rotation of the external rotor 16 and therefore also of the fan 86, a negative pressure is produced in the machine. This negative pressure results in air being transported radially outwards through the fan 86, i.e. between the housing base 80 and the half-ring 96 of the ring system 92, which is positioned closest to the housing base 80. This cooling air is deflected by the external rotor 16 and, as shown in FIG. 7, is pressed between the claw poles 104 and 105 and therefore into an interspace 265 in the axial direction. The cooling air flows around all of the three ring systems 92 and is then pressed by the fan 89 radially outwards through the ventilation openings 90 into the surrounding environment.

The negative pressure produced by the fan 86 means that a negative pressure is produced at that end of the ventilation channel 113 which is directly opposite the fan 86 and therefore cooling air then flows through the ventilation channel 113. At that end of the ventilation channel(s) 113, which is remote from the fan 86, cooling air is sucked from the surrounding environment, for example in the region of the connections 108, 109 and 110, through the flange 31 and therefore through the through-opening 149 (FIG. 4). In addition, cooling air is sucked into the machine through openings 270 in the cover 25 in order first to cool the electronics 28 and then to flow through openings (not shown in FIG. 1) in the cooling plate 127 to the through-opening 149 (FIG. 2) and into the ventilation channels 113. In addition, the fan 89 sucks additional cooling air for cooling the electronics 28 through the slots 142 and the groove 133 and openings (not shown) in the cooling plate 127.

A transverse flux machine 10 with a stator 13 and an external rotor 16, which is arranged around the stator 13, is thus disclosed, the stator 13 having two axial end sides 273, 276 remote from one another, with an inner yoke 107 of the stator 13, with a cooling path which is arranged radially within the inner yoke 107, the cooling path emerging from the transverse flux machine 10 on that axial end side 276 of the stator 13 which faces the inlet side, the cooling path running between the inlet and the outlet in an interspace between the stator 13 and the external rotor 16.

Figure 20:
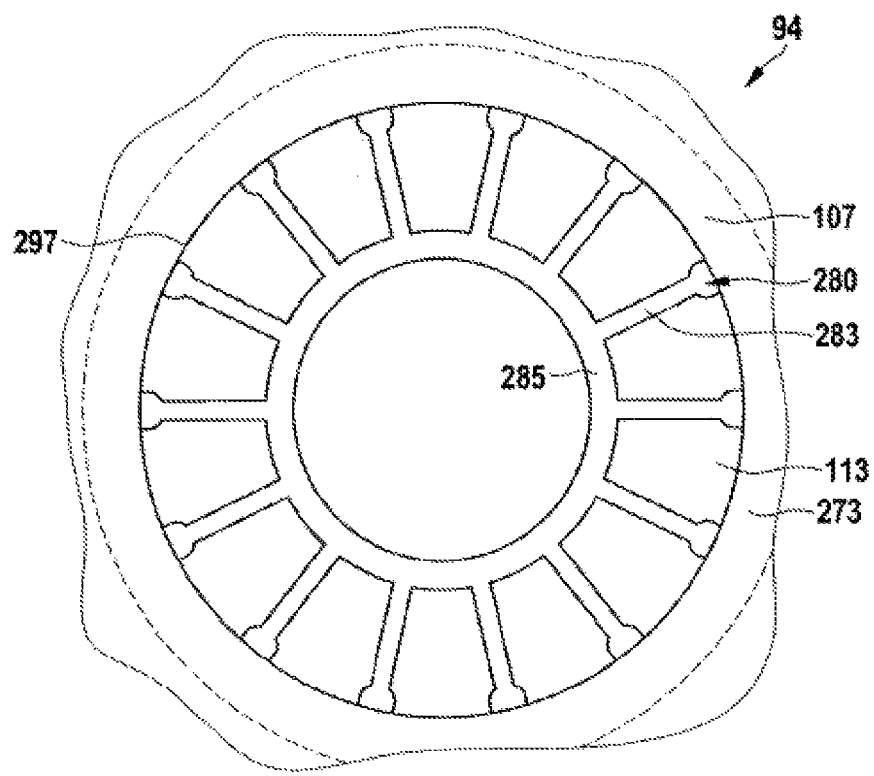
FIG. 20 shows a variant of a stator.

FIG. 20 shows a detail of a view of a variant of the stator 13. In contrast to the previous variant, the half-rings 94, 96 are delimited radially inwards by the inner yoke 107, i.e. the half-rings 94, 96 do not have any webs 158. Instead, the half-rings 94, 96 have a central, preferably round opening 279. A cooling rib element 280 consisting of a less expensive material such as an aluminum alloy, for example, is inserted into this opening 279, i.e. adjacent to the inner yoke 107, said cooling rib element 280 enabling heat emission from the half-rings 94, 96 by means of cooling ribs 283 and enabling centering of the half-rings 94, 96, preferably by means of an inner ring 285, on the sleeve 52. The cooling rib element 280 can be an extruded profile, for example.

Figure 21:
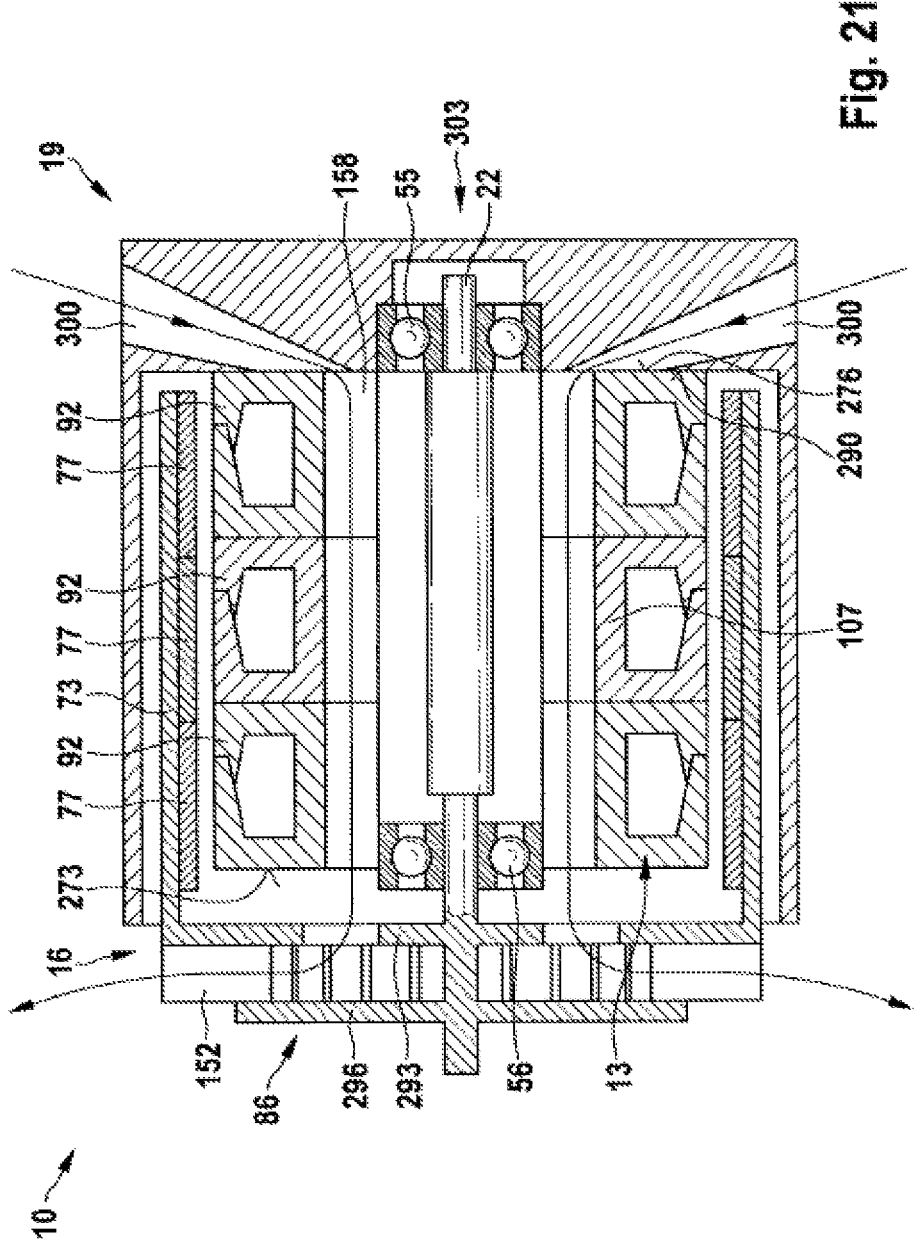
FIG. 21 shows a second embodiment of an electric machine with the configuration of a transverse flux machine.

FIG. 21 shows a sketch of a further exemplary embodiment of a transverse flux machine 10. Identically functioning component parts are denoted by the same reference numerals. Thus, a three-phase stator 13 with three ring systems 92 is fastened on a housing inner wall 290 on a housing 19. A shaft 22 is mounted both in the housing 19 and radially within the stator 13, for which purpose the rolling bearings 55 and 56 are used. A supporting plate 293 is fastened with concomitant rotation on that end of the shaft 22 which is remote from the housing inner wall 290. This supporting plate 293 bears fan blades 152 radially and axially on the outside. A section 73 in the form of a cylinder ring is mounted on that side of the supporting plate which is opposite the fan blades 152. As was previously the case, permanent magnets 77 are likewise fastened in three rows on the cylindrical inner side of said section 73, said permanent magnets magnetizing the ring systems 92 with their magnetic field. An end plate 296 between the shaft 22 and fan blades 152 serves to improve the fan efficiency. By virtue of rotation of the shaft, for example by means of a pulley (not illustrated) at the left-hand end of the shaft 22, the fan 86 brings about a negative pressure at the outer edge of the fan 86. A draught of air or cooling air is thus produced through the machine, said draught being described by the two long arrows, beginning at the cooling air inlet 300. The cooling air therefore moves first from an inlet side 303 on one side of the stator 13 radially inwards in order to be deflected there in the axial direction (axis of rotation of the external rotor 16). Then, the cooling air flows past webs 158 in the axial direction in the interior of the stator 13. Then, the cooling air emerges from that side of the stator 13 which is remote from the inlet side in order to be deflected radially outwards and to be passed out of the machine by the fan blades 152.

A transverse flux machine with a stator 13 and an external rotor 16 which is arranged around the stator 13 is thus disclosed, the stator 13 having two axial end sides 273, 276, with an inner yoke 107 of the stator 13, with a cooling path, which is arranged radially within the inner yoke 107, the cooling path emerging from the transverse flux machine 10 on that axial end side 273 of the stator 13 which is remote from an inlet side 303.

The invention claimed is:

1. A transverse flux machine with a stator (13) and an external rotor (16), which is arranged around the stator (13), the stator (13) including a stator winding (98) and having two axial end sides (273, 276), with an inner yoke (107) of the stator (13), with a cooling path and an output (108, 109, 110) of the stator winding (98) arranged radially within the inner yoke (107), the cooling path including a ventilation channel (113) offset from an axis of rotation (136), the output (108, 109, 110) extending through the ventilation channel (113), the stator characterized in that either
    a) the cooling path emerges from the transverse flux machine (10) on that axial end side (273) of the stator (13) which is remote from an inlet side (303) or
    b) the cooling path emerges from the transverse flux machine (10) on that axial end side (276) of the stator (13) which faces the inlet side, the cooling path running between an inlet and an outlet in an interspace (265) between the stator (13) and the external rotor (16).

2. The transverse flux machine as claimed in claim 1, characterized in that webs (158) protruding from the inner yoke (107) extend radially inwards.

3. The transverse flux machine as claimed in claim 2, characterized in that the webs (158) are integrally formed on the inner yoke (107).

4. The transverse flux machine as claimed in claim 3, characterized in that webs (158) which are spaced apart in the circumferential direction are integrally connected to one another radially on an inside by a ring region (162) and a plurality of ring regions (162) are braced with one another in the axial direction.

5. The transverse flux machine as claimed in claim 1, characterized in that a cooling rib element (280) is inserted in the inner yoke (107).

6. The transverse flux machine as claimed in claim 5, characterized in that the cooling rib element (280) centers half-rings (94, 96) of the stator (13) on a sleeve (52).

7. The transverse flux machine as claimed in claim 1, characterized in that half-rings (94, 96) are delimited radially inwards by the inner yoke (107), a cooling rib element (280) being inserted into the inner yoke (107), said cooling rib element enabling heat emission from the half-rings (94, 96) by means of cooling ribs (283) and enabling the half-rings (94, 96) on a sleeve (52).

8. The transverse flux machine of claim 1, further including an insulating layer (205), wherein the stator winding (98) is a first stator winding (98) and the output (108, 109, 110) is a first output (108, 109, 110) of the first stator winding (98), the stator (13) further including a second stator winding (98) and a second output (108, 109, 110) of the second stator winding (98) adjacent the first output (108, 109, 110), wherein the insulating layer (205) extends between a planar surface of the first output (108, 109, 110) and a parallel, planar surface of the second output (108, 109, 110).

9. The transverse flux machine of claim 8, wherein the second output (108, 109, 110) and the insulating layer (205) extend through the ventilation channel.

10. The transverse flux machine of claim 1, further including an annular sleeve (52) extending along the ventilation channel (113), and wherein the ventilation channel (113) is arranged radially between the inner yoke (107) and the annular sleeve (52).

* * * * *